March 16, 1926.  1,577,211
P. ERICKSON
BALL RETAINER
Original Filed Dec. 14, 1922
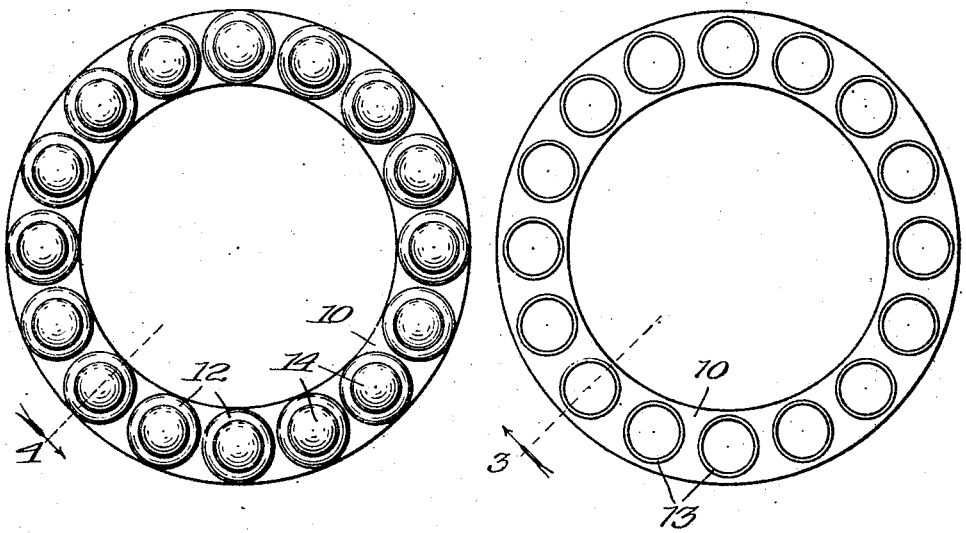
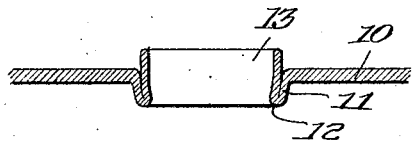
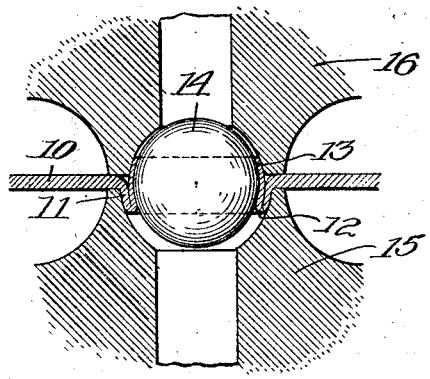
Inventor:
Petrus Erickson, Patented Mar. 16, 1926.

1,577,211

UNITED STATES PATENT OFFICE.

PETRUS ERICKSON, OF CHICAGO, ILLINOIS, ASSIGNOR, BY MESNE ASSIGNMENTS, TO MARLIN-ROCKWELL CORPORATION, OF JAMESTOWN, NEW YORK, A CORPORATION OF NEW YORK.

BALL RETAINER.

Original application filed December 14, 1922, Serial No. 606,851. Divided and this application filed December 6, 1923. Serial No. 678,883.

*To all whom it may concern:*

Be it known that I, PETRUS ERICKSON, a citizen of the United States, residing at Chicago, in the county of Cook and State of Illinois, have invented a new and useful Improvement in Ball Retainers, of which the following is a specification.

This invention relates to ball retainers and the like, and is fully described in the following specification shown in the accompanying drawings, in which—

Figure 1 is a front elevation of a ball retainer for a thrust bearing with a set of balls assembled therein;

Fig. 2 is a reverse view of the retainer alone before the balls are assembled therein;

Fig. 3 is an enlarged section on the line 3 of Fig. 2; and

Fig. 4 is a section on the line 4 of Fig. 1.

This is a division of my application, Serial No. 606,851, filed December 14, 1922, which matured into Patent No. 1,481,000 dated January 15, 1924.

The ball retainer shown is adapted to be used on thrust bearings and has a flat annular ring 10 from which have been stamped cylindrical members which are made by a method described in the above named patent application.

Each member consists of a substantially cylindrical portion 11 which is integral with the ring 10 and extends in one direction, and is bent back upon itself at 12 and has another and smaller cylindrical portion 13 which extends through the cylindrical portion 11 as shown in Fig. 3.

The lower end of the portion 13 and the connecting portion 12 are made slightly spherical so as to retain a ball 14 therein, but allowing the latter sufficient play that it may freely turn in the spherical portion as a socket.

After the ball 14 is placed within this socket the retainer and ball are placed over a die 15, and a die 16 is forced down over the upper end of the cylindrical portion 13, forcing the latter about the ball as shown in Fig. 4, thereby squeezing the material about the ball so that it can no longer be removed, but will still be free to turn within its socket.

It will be apparent that either the complete retainer with the balls assembled therein as shown in Fig. 1 or the retainer as shown in Fig. 2 before the balls are assembled therein is an article of manufacture and may be placed upon the market.

While I have shown and described but a single embodiment of my invention, it is to be understood that it is capable of many modifications. Changes, therefore, in the construction and arrangement may be made without departing from the spirit and scope of the invention as disclosed in the appended claims, in which it is my intention to claim all novelty inherent in my invention as broadly as possible in view of the prior art.

What I claim as new, and desire to secure by Letters Patent is:

1. A ball retainer having a body, a tubular portion integral with said body and extending through an opening in the body and being integrally connected thereto by a second tubular portion extending outside the first mentioned tubular portion.

2. A ball retainer having a body, a tubular portion integral with said body and extending through an opening in the body and being integrally connected thereto by a second tubular portion extending outside the first mentioned tubular portion, the junction of the two tubular portions being reduced to retain a ball therein.

3. A ball retainer having a series of integral sleeves lying substantially at right angles to the body of the retainer, and being doubled back to form a second sleeve within the first mentioned sleeve.

4. A ball retainer having a metal body, a tubular retaining portion integrally connected thereto and extending therefrom on one side of said body, said tube returning within itself and terminating on the opposite side of said body, one end of said tube being reduced to retain a ball therein.

5. A ball retainer having a sheet-metal body provided with an opening therein, and a continuous tubular member secured to said body and extending through said body and beyond the opposite surfaces of said body, said member having one end reduced to retain a ball therein.

6. A ball retainer having a sheet-metal body provided with an opening therein, and a continuous tubular member integral with said body and extending through said body and beyond the opposite surfaces of said body, said member having one end reduced to retain a ball therein.

PETRUS ERICKSON.